US010658698B2

(12) United States Patent
Sivanandan et al.

(10) Patent No.: US 10,658,698 B2
(45) Date of Patent: May 19, 2020

(54) PEO-BASED GRAFT COPOLYMERS WITH PENDANT FLUORINATED GROUPS FOR USE AS ELECTROLYTES

(71) Applicant: Seeo, Inc., Hayward, CA (US)

(72) Inventors: Kulandaivelu Sivanandan, Fremont, CA (US); Jonathan C. Pistorino, Oakland, CA (US); Hany Basam Eitouni, Oakland, CA (US)

(73) Assignee: SEEO, INC., Hayward, CA (US)

( * ) Notice: Subject to any disclaimer, the term of this patent is extended or adjusted under 35 U.S.C. 154(b) by 23 days.

(21) Appl. No.: 16/005,576

(22) Filed: Jun. 11, 2018

(65) Prior Publication Data

US 2018/0294523 A1  Oct. 11, 2018

Related U.S. Application Data

(60) Division of application No. 15/164,733, filed on May 25, 2016, now Pat. No. 10,038,216, which is a continuation of application No. PCT/US2016/032541, filed on May 13, 2016.

(60) Provisional application No. 62/173,336, filed on Jun. 9, 2015.

(51) Int. Cl.
*H01M 10/0565* (2010.01)
*H01M 10/0525* (2010.01)
*H01M 4/134* (2010.01)

(52) U.S. Cl.
CPC ... *H01M 10/0565* (2013.01); *H01M 10/0525* (2013.01); *H01M 4/134* (2013.01); *H01M 2300/0025* (2013.01)

(58) Field of Classification Search
CPC ............. H01M 4/134; H01M 10/0525; H01M 10/0565; H01M 2300/0025
See application file for complete search history.

(56) References Cited

U.S. PATENT DOCUMENTS

| | | | |
|---|---|---|---|
| 3,821,297 A | 6/1974 | Resnick | |
| 5,714,277 A | 2/1998 | Kawakami | |
| 5,736,274 A | 4/1998 | Umemoto et al. | |
| 5,783,333 A | 7/1998 | Mayer | |
| 6,210,835 B1 | 4/2001 | Arai | |
| 6,537,704 B1 | 3/2003 | Akashi et al. | |
| 8,067,114 B2 | 11/2011 | Kim et al. | |
| 9,368,775 B2 | 6/2016 | Visco et al. | |
| 2001/0036577 A1 | 11/2001 | Nakane et al. | |
| 2002/0048706 A1 | 4/2002 | Mayes et al. | |
| 2002/0110739 A1 | 8/2002 | McEwen et al. | |
| 2002/0127475 A1 | 9/2002 | Marchionni et al. | |
| 2003/0049538 A1 | 3/2003 | Buerger et al. | |
| 2003/0108800 A1 | 6/2003 | Barbarich | |
| 2003/0181572 A1 | 9/2003 | Tan et al. | |
| 2004/0043298 A1 | 3/2004 | Lee | |
| 2004/0151985 A1 | 8/2004 | Munshi | |
| 2004/0170901 A1 | 9/2004 | Blau et al. |
| 2005/0034993 A1 | 2/2005 | Gozdz et al. |
| 2005/0287441 A1 | 12/2005 | Passerini et al. |
| 2006/0035987 A1 | 2/2006 | Paddison |
| 2006/0127766 A1 | 6/2006 | Yamate |
| 2007/0178133 A1 | 8/2007 | Rolland |
| 2008/0114143 A1 | 5/2008 | Brothers et al. |
| 2009/0004568 A1 | 1/2009 | Hirose et al. |
| 2009/0023038 A1 | 1/2009 | DeSimone et al. |
| 2009/0029249 A1 | 1/2009 | Takami et al. |
| 2009/0182087 A1 | 7/2009 | Fudemoto et al. |
| 2011/0111308 A1 | 5/2011 | Halalay et al. |
| 2011/0281173 A1 | 11/2011 | Singh et al. |
| 2012/0121989 A1 | 5/2012 | Roberts et al. |
| 2013/0063092 A1 | 3/2013 | Yang et al. |
| 2013/0130069 A1 | 5/2013 | Mullin et al. |
| 2013/0228950 A1 | 9/2013 | DeSimone et al. |
| 2013/0273419 A1 | 10/2013 | Pistorino et al. |
| 2014/0221689 A1 | 8/2014 | Klun et al. |
| 2014/0272600 A1 | 9/2014 | Bouchet et al. |
| 2016/0028114 A1 | 1/2016 | Pratt et al. |
| 2016/0093895 A1 | 3/2016 | Du et al. |
| 2016/0211498 A1 | 7/2016 | Kim et al. |
| 2016/0221926 A1 | 8/2016 | Teran et al. |
| 2016/0226101 A1 | 8/2016 | Teran et al. |
| 2016/0226102 A1 | 8/2016 | Teran et al. |
| 2016/0226103 A1 | 8/2016 | Teran et al. |
| 2016/0329613 A1 | 11/2016 | Kusachi et al. |
| 2017/0117583 A1 | 4/2017 | Matsuno et al. |

FOREIGN PATENT DOCUMENTS

| | | | |
|---|---|---|---|
| JP | 2009206004 A | | 9/2009 |
| WO | 2007142731 A2 | | 12/2007 |
| WO | 2010083325 A1 | | 7/2010 |
| WO | 2011051275 A1 | | 5/2011 |
| WO | WO 2011/146670 | * | 11/2011 |
| WO | 2014190278 A1 | | 11/2014 |
| WO | 2014204547 A2 | | 12/2014 |
| WO | 2015022229 A1 | | 2/2015 |

OTHER PUBLICATIONS

International Search Report for PCT/US16/31685, dated Aug. 16, 2016.
International Search Report for PCT/US2016/025950.
International Search Report for PCT/US2016/030602.
International Search Report for PCT/US2016/032541.
International Search Report for PCT/US2016/033967 dated Aug 23, 2016.
Machine Translation of JP2009-206004A.
References that give dielectric constants for various materials in support of response to OA mailed Nov. 2, 2017. Relevent data is highlighted with red boxes.

(Continued)

*Primary Examiner* — Anca Eoff
(74) *Attorney, Agent, or Firm* — Brooks Kushman P.C.

(57) ABSTRACT

Syntheses of graft copolymers based on PEO and fluorinated functional groups are described. Grafting of fluorinated groups reduces the $T_m$ of PEO and also increases the miscibility of PEO with ionic liquids, so that addition of ionic liquids improves ionic conductivity even at room temperature. The disclosed copolymers containing fluorinated functionality have superior safety and are more flame retardant as compared to traditional electrolytes. Such copolymers can be used as either solid or gel electrolytes in Li batteries.

20 Claims, 6 Drawing Sheets

(56) References Cited

OTHER PUBLICATIONS

Smart. "Improved performance of lithium-ion cells with the use of fluorinated carbonate-based electrolytes," Journal of Power Sources 119-121 (2003) 359-367.
Wong et al.: Nonflammable perfluoropolyether-based electrolytes for lithium batteries. PNAS. 111, 9. 3327-3331; Mar. 4, 2014. [retrieved on May 18, 2016]. Retrieved from the Internet. <URL: http://www.pnas.org/contentl111/9/3327.full.pdf>. entire document.

* cited by examiner

400

410   420

415   425

440

PEO-BASED GRAFT COPOLYMERS WITH PENDANT FLUORINATED GROUPS FOR USE AS ELECTROLYTES

CROSS-REFERENCE TO RELATED APPLICATIONS

This application is a divisional application of U.S. patent application Ser. No. 15/164,733, filed May 25, 2016, now U.S. Pat. No. 10,038,216 issued Jul. 31, 2018, which is a non-provisional application of U.S. Provisional Patent Application 62/173,336, filed Jun. 9, 2015, and is also a continuation application of International Application PCT/US2016/032541, filed May 13, 2016, all of which are incorporated by reference herein.

BACKGROUND OF THE INVENTION

Field of the Invention

This invention relates generally to polyethylene oxide copolymers that contain fluorinated groups, and, more specifically, to electrolytes that employ such polymers.

Poly(ethylene oxide) (PEO) is a well-known polymer electrolyte for lithium ion batteries due to its ability to dissolve lithium salts and its relatively high ionic conductivity at elevated temperatures. However, ionic conductivity of PEO at room temperature is about $10^{-5}$ S/cm, which is below ionic conductivities (greater than $10^{-3}$ S/cm) that are desirable for commercial applications. Low PEO ionic conductivity may be due to its crystalline nature at room temperature, as above 55° C., the melting temperature ($T_m$) of PEO, the ionic conductivity reach values of $10^{-4}$ S/cm or more.

Polymers made from perfluoro functional groups, such as perfluoro alkanes (PFA), are low $T_g$ (less than −100° C.), non-flammable and chemically inert polymers, which might make them useful as electrolytes in electrochemical cells. But, unfortunately they also have low dielectric constants (DCs) and poor salt dissolution ability, which works against their suitability as electrolytes for electrochemical cells.

It would be useful to find a way to combine PEO and PFA polymers to make electrolytes that exploit the useful properties of both.

BRIEF DESCRIPTION OF THE DRAWINGS

The foregoing aspects and others will be readily appreciated by the skilled artisan from the following description of illustrative embodiments when read in conjunction with the accompanying drawings.

SUMMARY

Figure 1:
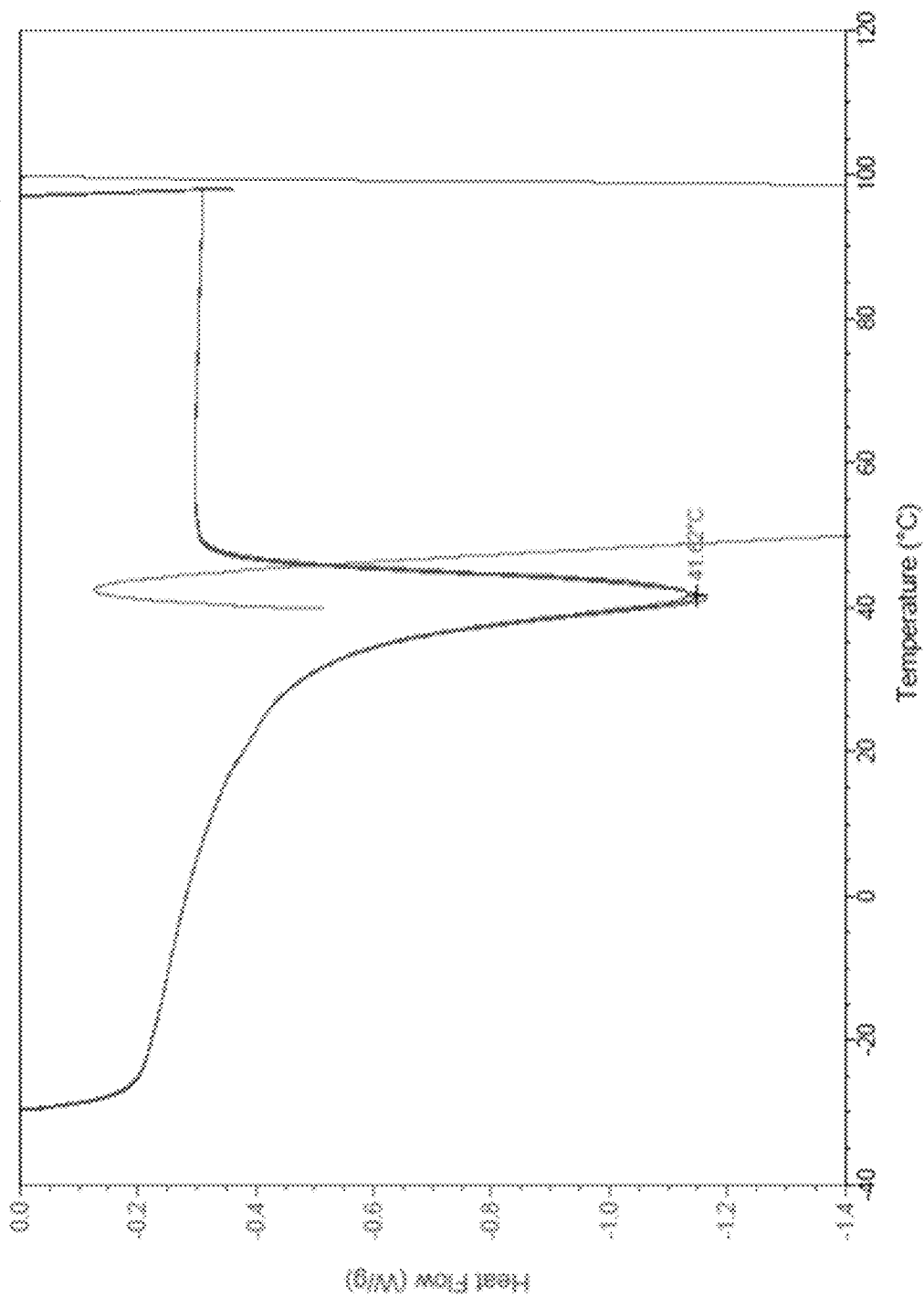
FIG. 1 is a differential scanning calorimetry (DSC) trace of the compound shown as (2) below with a 2.3 mol % pefluro alkane (PFA) repeat unit.

A polymer electrolyte is disclosed. The polymer electrolyte includes a metal salt and a graft copolymer that has a plurality of PEO molecules and perfluoro functional groups grafted onto at least a portion of the plurality of PEO molecules. The perfluoro functional groups may compose between 1 mol % and 20 mol % of the graft copolymer. The perfluoro functional groups may have a molecular weight ranging from 200 to 10,000 Da.

In one embodiment of the invention, the perfluoro functional groups can be any of PFPE, polyvinylene fluoride, polyvinylfluoride, polytetrafluoroethylene, PFA, cyclic perfloro alkanes such as perfluoro(methylcyclohexane) and perfluoro(methylcyclopentane) and aromatic versions such as pentafluorophenoxide, 2,3,5,6-tetrafluorophenol, and combinations thereof. The PEO may have a molecular weight between 10 and 500 KDa. The metal salt may include at least one lithium salt. In one arrangement, the polymer electrolyte also includes an ionic liquid.

In another embodiment of the invention, a block copolymer electrolyte is disclosed. The block copolymer electrolyte has a first block comprising a metal salt and a graft copolymer that includes a plurality of PEO molecules that have perfluoro functional groups grafted onto at least a portion of the plurality of PEO molecules and a second block that contains a polymer that has a modulus in excess of $1\times10^5$ Pa at temperatures at and below 25° C. The block copolymer electrolyte may be either a diblock copolymer or a triblock copolymer electrolyte.

The polymer of the second block may be any of polystyrene, hydrogenated polystyrene, polymethacrylate, poly(methyl methacrylate), polyvinylpyridine, polyvinylcyclohexane, polyimide, polyamide, polypropylene, poly (2,6-dimethyl-1,4-phenylene oxide) (PXE), polyolefins, poly(t-butyl vinyl ether), poly(cyclohexyl methacrylate), poly (cyclohexyl vinyl ether), polyethylene, fluorocarbons, polyvinylidene fluoride, and copolymers that contain styrene, methacrylate, and/or vinylpyridine.

The metal salt may include at least one lithium salt. The block copolymer electrolyte may also include an ionic liquid.

In another embodiment of the invention, a battery cell has an anode comprising lithium metal, a cathode comprising cathode active material and a first electrolyte, and a separator comprising a second electrolyte. The second electrolyte includes a graft copolymer that has a plurality of PEO molecules, perfluoro functional groups grafted onto at least a portion of the plurality of PEO molecules, and a lithium salt. In one arrangement, the perfluoro functional groups compose between 1 mol % and 20 mol % of the graft copolymer.

The first electrolyte may also include a graft copolymer that has a plurality of PEO molecules, perfluoro functional groups grafted onto at least a portion of the plurality of PEO molecules, and a lithium salt. The perfluoro functional groups may compose between 1 mol % and 20 mol % of the graft copolymer.

In another embodiment of the invention, an electrode includes electrode active material and a polymer electrolyte that has a plurality of PEO molecules, perfluoro functional groups grafted onto at least a portion of the plurality of PEO molecules to form a graft copolymer, and a lithium salt. In one arrangement, the electrode is a positive electrode or cathode.

DETAILED DESCRIPTION

The preferred embodiments are illustrated in the context of electrolyte materials in a lithium battery cell. The skilled artisan will readily appreciate, however, that the materials and methods disclosed herein will have applications in a number of other contexts where high ionic conductivity is desirable, particularly where low temperature is important.

These and other objects and advantages of the present invention will become more fully apparent from the following description taken in conjunction with the accompanying drawings.

In this disclosure, the terms "negative electrode" and "anode" are both used to mean "negative electrode". Likewise, the terms "positive electrode" and "cathode" are both used to mean "positive electrode".

Molecular weights in this disclosure have been determined by the weight-averaged method. Some abbreviations used in this disclosure are shown in Table I below.

TABLE I

| Abbreviation | Meaning |
|---|---|
| PEO | poly(ethylene oxide) |
| PFPE | perfluoropolyether |
| PFA | perfluoro alkane |
| MPITFSI | 1-methyl-3-propylimidazolium bis(trifluoromethylsulfonyl)imide |
| $^1$H NMR | proton nuclear magnetic resonance spectroscopy |
| GPC | gel permeation chromatography |
| DSC | differential scanning calorimetry |

In one embodiment of the invention, PEO has been modified to reduce its melting temperature, thus also suppressing its crystallization temperature, by grafting it with perfluoro functional groups. When such a PEO grafted with perfluoro functional groups is combined with an electrolyte salt, it can be used as an electrolyte with good ionic conductivity at lower temperatures than had been possible for PEO alone. It has been found that addition of an ionic liquid to such an electrolyte can increase the ionic conductivity even more than would be expected.

As the proportion of perfluoro functional groups increases, both the ionic conductivity and the $T_m$ of the PEO graft-copolymer electrolyte decreases. At the same time, the decreased $T_m$ makes it possible to use the PEO copolymer as an electrolyte at lower temperatures without its crystallization and concomitant reduction in ionic conductivity. Through careful experimentation, an optimal proportion of perfluoro functional groups to include in a PEO graft-copolymer may be determined for a particular application.

In one embodiment, a PEO based polymer contains randomly distributed, grafted fluorinated groups. The fluorinated groups may be one or more of perfluoro alkanes (PFA), fluoropolyethers and perfluoropolyethers (PFPE), poly(perfluoroalkyl acrylate), poly(perfluoroalkyl methacrylate), polytetrafluoroethylene, polychlorotrifluoroethylene, and polyvinylidene fluoride, and combinations thereof. The perfluoropolyether may include a segment such as difluoromethylene oxide, tetrafluoroethylene oxide, hexafluoropropylene oxide, tetrafluoroethylene oxide-co-difluoromethylene oxide, hexafluoropropylene oxide-co-difluoromethylene oxide, or a tetrafluoroethylene oxide-co-hexafluoropropylene oxide-co-difluoromethylene oxide groups, or combinations thereof.

In one arrangement, the perfluoro functional groups make up between 1 mol % and 30 mol % of the PEO graft copolymer. In another arrangement, the perfluoro functional groups make up between 1 mol % and 20 mol % of the PEO graft copolymer. In yet another arrangement, the perfluoro functional groups make up between 2 mol % and 5 mol % of the PEO graft copolymer.

In one arrangement, the perfluoro functional groups have a molecular weight ranging from 200 to 500 Da. In another arrangement, the perfluoro functional groups have a molecular weight ranging from 500 to 10,000 Da. In yet another arrangement, the perfluoro functional groups have a molecular weight ranging from 10,000 to 100,000 Da. In yet another arrangement, the perfluoro functional groups have a molecular weight ranging from 200 to 100,000 Da, or any range subsumed therein. In yet another arrangement, the perfluoro functional groups have a molecular weight ranging from 200 to 10,000 Da.

PEO-Graft-PFPE Copolymers

In one embodiment of the invention, grafting of PFPE onto PEO was accomplished by nucleophilic substitution of PFPE-based alkoxide on chloromethyl groups in P(EO-r-EPCH) as shown below in (1) below. The amount of PFPE was controlled by changing either the grafting density or the molecular weight of the PFPE reactant.

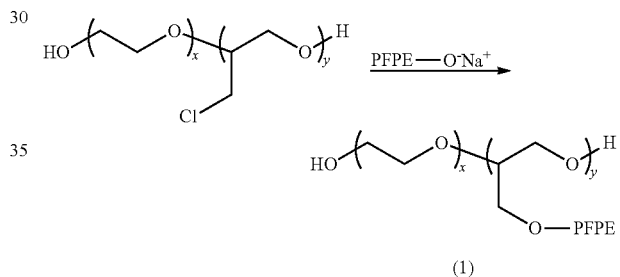

(1)

wherein x and y represent the relative mole fractions of the two types of monomers in the copolymer and can have values from 0 to 100%.

In one arrangement, the pure PEO component makes up between about 20 and 99 mol %, or any range subsumed therein, of the product polymer shown in (1) above. In another arrangement, the PEO component makes up between about 50 and 90 mol %, or any range subsumed therein, of the product polymer shown in (1) above. In another arrangement, the PEO component makes up between about 90 and 97 mol %, or any range subsumed therein, of the product polymer shown in (1) above.

In one arrangement, the molecular weight of starting P(EO-r-EPCH) polymer ranges between 10 and 50 KDa, or any range subsumed therein. In another arrangement, the molecular weight of starting P(EO-r-EPCH) polymer ranges between 20 and 200 KDa, or any range subsumed therein. In another arrangement, the molecular weight of starting P(EO-r-EPCH) polymer ranges between 200 and 8000 KDa, or any range subsumed therein. In one arrangement, the molecular weight of PFPE ranges between 0.2 and 15 KDa, or any range subsumed therein. In another arrangement, the molecular weight of PFPE ranges between 100 and 500 KDa, or any range subsumed therein.

Other fluorinated grafting groups are also possible in the general structure shown in (1). Cyclic perfloro alkanes such as perfluoro(methylcyclohexane) and perfluoro(methylcyclopentane) and aromatic versions such as pentafluorophenoxide and 2,3,5,6-tetrafluorophenol may be grafted onto the PEO based polymer.

In one embodiment of the invention, PEO-graft-PFPE copolymers are combined with metal salts to form ionically-conductive electrolytes. Some useful metal salts are listed below.

PEO-Graft-PFA Copolymers

In various embodiments of the invention, grafting of PFA onto PEO was accomplished using one of two different synthetic approaches, which are shown below. The amount of PFA can be controlled by changing either the grafting density or the molecular weight of the PFA reactant.

The first approach, shown as (2) below, involves nucleophilic substitution of perfluro alkoxide, which is generated from hydroxyl PFA using a base such as sodium hydride (NaH) or sodium hydroxide (NaOH). The perfluro alkoxide is reacted with pendant chloromethyl groups in P(EO-r-EPCH) to form the grafted copolymer.

In a second approach, a thiol-ene reaction between pefluoro alkane thiol and poly(EO-r-AGE) in the presence of a photoinitiator and under UV irradiation can be used to produce the graft copolymer in high yields, as shown in (3) below. The polymer product in (3) may be synthesized with various amounts of the pendant PFA units ranging from 1 to 30 mol %, or any range subsumed therein.

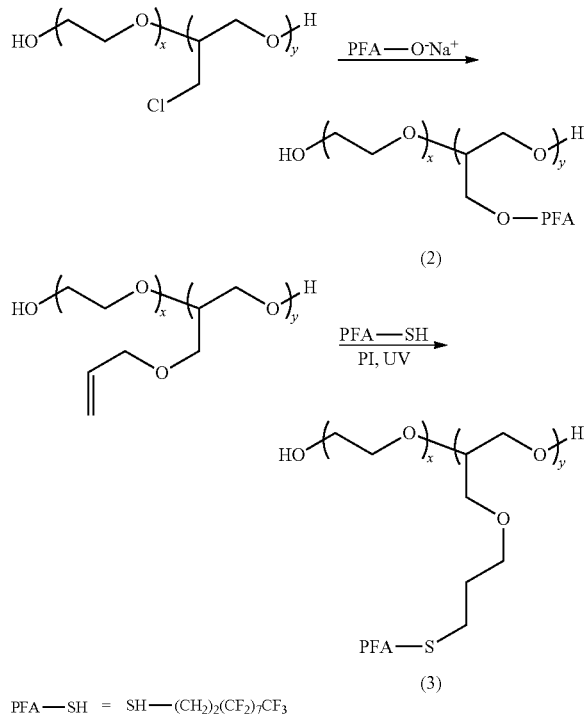

wherein x and y represent the relative mole fractions of the two types of monomers in the copolymer and can have values from 0 to 100%.

In one arrangement, the pure PEO component makes up between about 20 and 99 mol %, or any range subsumed therein, of the product polymer shown in (1) above. In another arrangement, the PEO component makes up between about 50 and 90 mol %, or any range subsumed therein, of the product polymer shown in (2) or (3) above. In another arrangement, the PEO component makes up between about 90 and 97 mol %, or any range subsumed therein, of the product polymer shown in (2) or (3) above.

In one arrangement, the molecular weight of starting P(EO-r-EPCH) polymer ranges between 10 and 50 KDa, or any range subsumed therein. In another arrangement, the molecular weight of starting P(EO-r-EPCH) polymer ranges between 20 and 200 KDa, or any range subsumed therein. In another arrangement, the molecular weight of starting P(EO-r-EPCH) polymer ranges between 200 and 8000 KDa, or any range subsumed therein. In one arrangement, the molecular weight of PFPE ranges between 0.2 and 15 KDa, or any range subsumed therein. In another arrangement, the molecular weight of PFPE ranges between 100 and 500 KDa, or any range subsumed therein.

Other fluorinated grafting groups are also possible in the general structure shown in (2) or (3). Cyclic perfloro alkanes such as perfluoro(methylcyclohexane) and perfluoro(methylcyclopentane) and aromatic versions such as pentafluorophenoxide and 2,3,5,6-tetrafluorophenol may be grafted onto the PEO based polymer.

In one embodiment of the invention, PEO-graft-PFA copolymers are combined with metal salts to form ionically-conductive electrolytes. Some useful metal salts are listed below.

In an exemplary embodiment, the graft polymer product in (3) was synthesized with various amounts, ranging from 1 to 30 mol %, of pendant PFA units. The graft polymer product (3) materials were characterized using $^1$H NMR and GPC. A representative DSC trace of graft polymer product (3) with 2.3 mol % PFA repeat units is shown in FIG. 1. The $T_m$ of this graft copolymer is 41° C. as compared with 60° C. for PEO, suggesting a strong influence from the PFA grafted side chains in the crystallization temperature of the PEO-based copolymer.

In both of the approaches described in (2) and (3) above, the number of grafted PFA units can be varied by changing the amount of reactive functional groups in the starting PEO copolymer, either the —CH$_2$Cl in P(EO-r-ECH) or the allyl groups in P(EO-r-AGE). The number of PFA units can be chosen to tune the $T_m$ and the resulting ionic conductivity of the final material PEO Graft-Copolymer Additives Plasticizing additives may be combined with the polymer electrolytes to increase the ionic conductivity of the electrolytes. Essentially, any small molecule can function in this role, but it is desirable to use additives that do not react at the electrodes over the voltage range and operating temperature range of the battery cells. When the electrolytes are used without additives, the system is a dry solid polymer electrolyte. When additives are used, the system is a gel electrolyte. Non-volatile plasticizers are preferred when high temperature operation is desired. Such non-volatile plasticizers may increase ionic conductivity so much that cell opeating temperatures can be decreased. The increased ionic conductivity from the non-volatile plasticizer(s) may compensate for the decreased inherent ionic conductivity from the lower temperatures. But such non-volatile plasticizers may also be used stably at high temperatures due to their non-volatility, even to temperatures as high as 100° C. or higher. Dry electrolyte systems can also be used at high temperatures (100° C. or higher) due to their inherent non-volatility.

Ionic liquids are a class of non-volatile plasticizers that have been demonstrated to increase ionic conductivity of polymer electrolytes such as PEO. The ionic conductivity of PEO can be increased by the addition of ionic liquid, with the increase being proportional to the amount of ionic liquid added.

In one embodiment of the invention, when PEO-graft-PFA copolymer electrolytes are mixed with ionic liquids, they have higher ionic conductivities at low temperatures than the same copolymer electrolytes without ionic liquid, as would be expected. In an unforeseen discovery, the increase in the ionic conductivity of the mixture of the PEO-graft-PFA electrolyte and ionic liquids is greater than the increase in the ionic conductivity of the mixture of PEO homopolymer electrolyte with the same proportion of ionic liquid. Without wishing to be bound to any particular theory, it may be that the PEO-graft-PFA electrolyte has a higher affinity for the ionic liquid than does the pure PEO electrolyte. A higher affinity may result in better mixing including increased miscibility of the polymer with both the ionic liquid and the metal salts.

Figure 2:
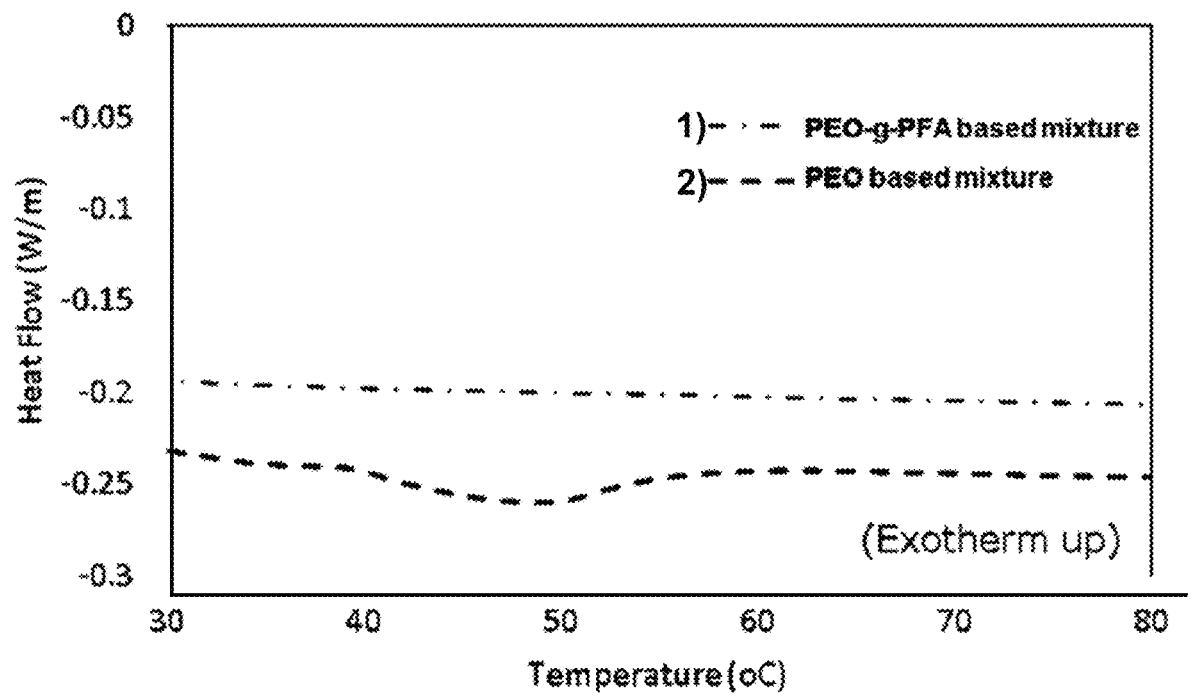
FIG. 2 shows DSC traces for 1) a PEO-graft-PFA copolymer with a 2.3 mol % PFA repeat unit mixed with LiTFSI and an ionic liquid and 2) a PEO polymer mixed with the same amounts of LiTFSI and the ionic liquid.

In an exemplary embodiment, graft polymer product (3) (with 2.3 mol % PFA repeat units) was mixed with a lithium salt (LiTFSI) and 30 wt % ionic liquid (1-methyl-3-propylimidazolium bis(trifluoromethylsulfonyl)imide). FIG. 2 shows a DSC trace for this electrolyte mixture (shown as 1) and for a mixture of PEO homopolymer with the same salt and ionic liquid in the same proportions (shown as 2). The crystalline melting peak from the PEO mixture sample at about 48° C. is evident, and there is no such peak for the graft polymer product (3) mixture, indicating that crystallization has been completely suppressed below the testing temperature window in the mixture with graft polymer product (3).

Figure 3:
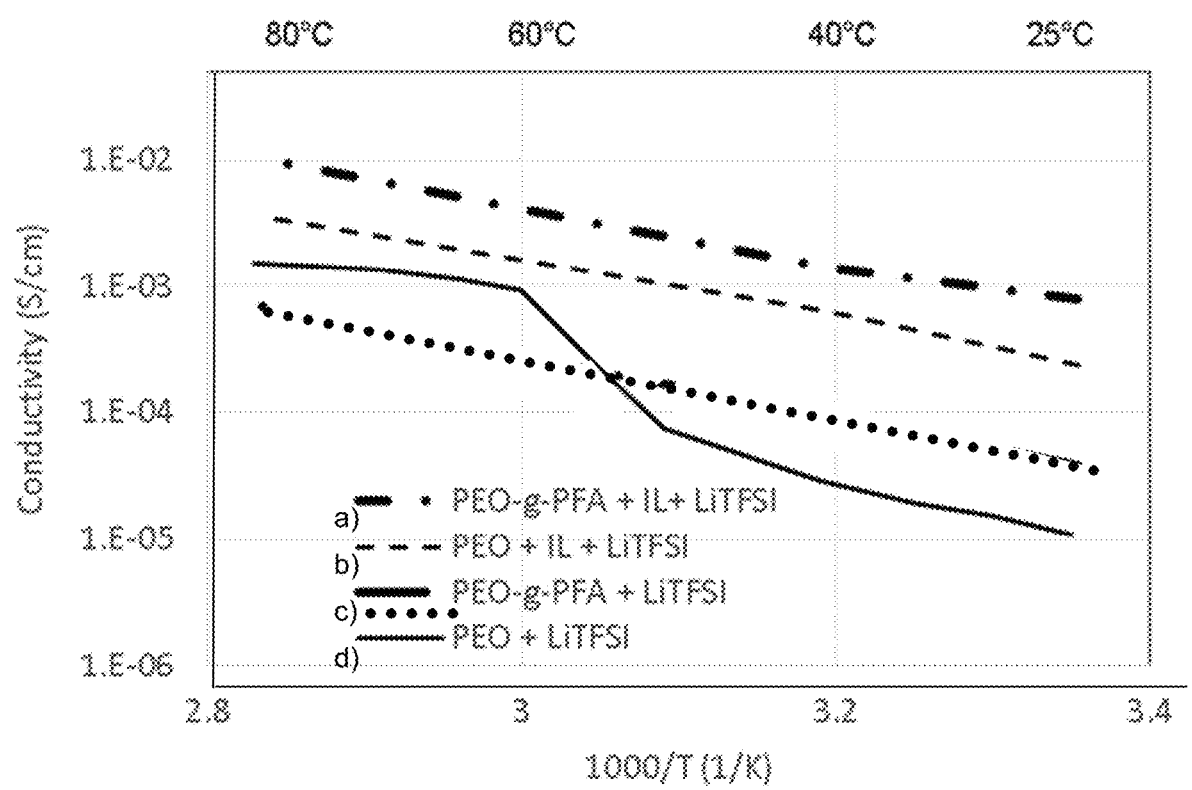
FIG. 3 shows graphs of ionic conductivity as a function of inverse temperature for cells made with various electrolyte mixtures, according to an embodiment of the invention.

FIG. 3 shows graphs of ionic conductivity as a function of inverse temperature for cells made with various electrolyte mixtures, according to an embodiment of the invention. The following four electrolyte mixtures were used:
  a) graft polymer product (3) (2.3 mol % PFA), 30 wt. % ionic liquid (1-methyl-3-propylimidazolium bis(trifluoromethylsulfonyl)imide) (MPITFSI), and LiTFSi (r=0.1 equivalent with respect to EO);
  b) PEO, 30 wt. % ionic liquid (1-methyl-3-propylimidazolium bis(trifluoromethylsulfonyl)imide) (MPITFSI), and LiTFSi (r=0.1 equivalent with respect to EO);
  c) graft polymer product (3) (2.3 mol % PFA) and LiTFSi (r=0.1 equivalent with respect to EO);
  d) PEO and LiTFSi (r=0.1 equivalent with respect to EO).

Ionic conductivities were measured as a function of temperature and are shown in FIG. 3.

Curve (d) shows the well-known ionic conductivity behavior of PEO electrolyte. At temperatures above $T_m$, ionic conductivity is on the order of $10^{-3}$ S/cm. Once PEO begins to crystallize around 60° C., the conductivity drops sharply and continues to drop to $10^{-5}$ around 25° C. Curve (c) in which the PEO graft-copolymer is used shows conductivity slightly less that of PEO alone (curve d) at 80° C. and decreases gradually throughout the temperature range shown but maintains a higher conductivity than PEO (curve d) at temperatures below the $T_m$ of PEO.

Curve (b) shows that PEO electrolyte combined with an ionic liquid has conductivity slightly more that of PEO alone (curve d) at 80° C. and decreases gradually throughout the temperature range shown. The really surprising result is shown by curve (a) for the PEO graft-copolymer combined with an ionic liquid. Ionic conductivity is about $10^{-2}$ S/cm at 80° C. and does not drop to $10^{-3}$ S/cm until temperatures around 35° C. This is a significant improvement in ionic conductivity for a PEO-based electrolyte and occurs over a wide range of temperatures.

Nanostructured Block Copolymer Electrolytes

In one embodiment of the invention, a solid polymer electrolyte, when combined with an appropriate salt, is chemically and thermally stable and has an ionic conductivity of at least $10^{-5}$ Scm$^{-1}$ at operating temperature. In one arrangement, the polymer electrolyte has an ionic conductivity of at least $10^{-3}$ Scm$^{-1}$ at operating temperature. Examples of useful operating temperatures include room temperature (25° C.), and 80° C. Examples of appropriate salts include, but are not limited to metal salts selected from the group consisting of chlorides, bromides, sulfates, nitrates, sulfides, hydrides, nitrides, phosphides, sulfonamides, triflates, thiocynates, perchlorates, borates, or selenides of lithium, sodium, potassium, silver, barium, lead, calcium, ruthenium, tantalum, rhodium, iridium, cobalt, nickel, molybdenum, tungsten or vanadium. Examples of specific lithium salts include LiSCN, LiN(CN)$_2$, LiClO$_4$, LiBF$_4$, LiAsF$_6$, LiPF$_6$, LiCF$_3$SO$_3$, Li(CF$_3$SO$_2$)$_2$N, Li(CF$_3$SO$_2$)$_3$C, LiN(SO$_2$C$_2$F$_5$)$_2$, lithium alkyl fluorophosphates, lithium oxalatoborate, as well as other lithium bis(chelato)borates having five to seven membered rings, lithium bis(trifluoromethane sulfone imide) (LiTFSI), LiPF$_3$(C$_2$F$_5$)$_3$, LiPF$_3$(CF$_3$)$_3$, LiB(C$_2$O$_4$)$_2$, LiDFOB, and mixtures thereof. In other embodiments of the invention, for other electrochemistries, electrolytes are made by combining the polymers with various kinds of salts. Examples include, but are not limited to AgSO$_3$CF$_3$, NaSCN, NaSO$_3$CF$_3$, KTFSI, NaTFSI, Ba(TFSI)$_2$, Pb(TFSI)$_2$, and Ca(TFSI)$_2$. As described in detail above, a block copolymer electrolyte can be used in the embodiments of the invention.

Figure 4A:
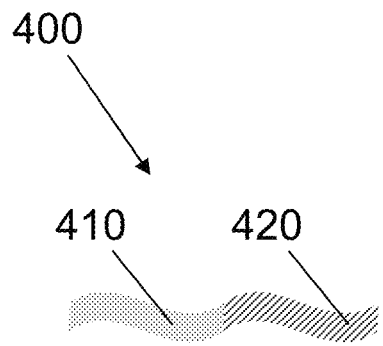
FIGS. 4A, 4B, and 4C are schematic drawings of a diblock copolymer and domain structures it can form, according to an embodiment of the invention.

FIG. 4A is a simplified illustration of an exemplary diblock polymer molecule 400 that has a first polymer block 410 and a second polymer block 420 covalently bonded together. In one arrangement both the first polymer block 410 and the second polymer block 420 are linear polymer blocks. In another arrangement, either one or both polymer blocks 410, 420 have a comb (or branched) structure. In one arrangement, neither polymer block is cross-linked. In another arrangement, one polymer block is cross-linked. In yet another arrangement, both polymer blocks are cross-linked.

Figure 4B:
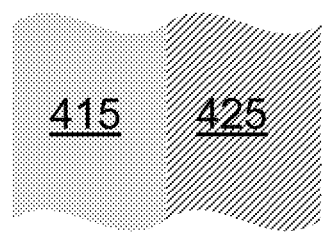
Figure 4C:
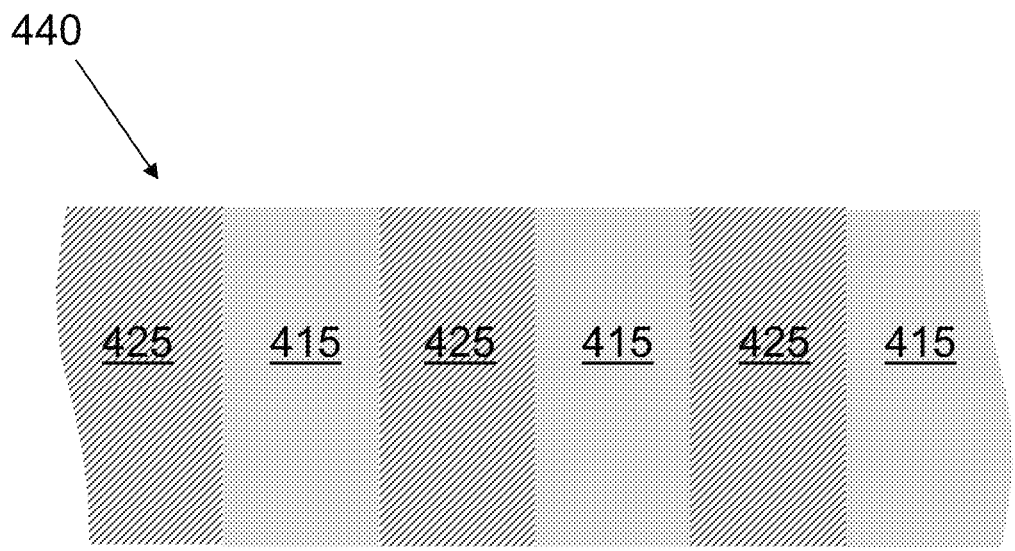

Multiple diblock polymer molecules 400 can arrange themselves to form a first domain 415 of a first phase made of the first polymer blocks 410 and a second domain 425 of a second phase made of the second polymer blocks 420, as shown in FIG. 4B. Diblock polymer molecules 400 can arrange themselves to form multiple repeat domains, thereby forming a continuous nanostructured block copolymer material 440, as shown in FIG. 4C. The sizes or widths of the domains can be adjusted by adjusting the molecular weights of each of the polymer blocks. In various embodiments, the domains can be lamellar, cylindrical, spherical, or gyroidal depending on the nature of the two polymer blocks and their ratios in the block copolymer.

In one arrangement the first polymer domain 415 is ionically conductive, and the second polymer domain 425 provides mechanical strength to the nanostructured block copolymer.

Figure 5A:
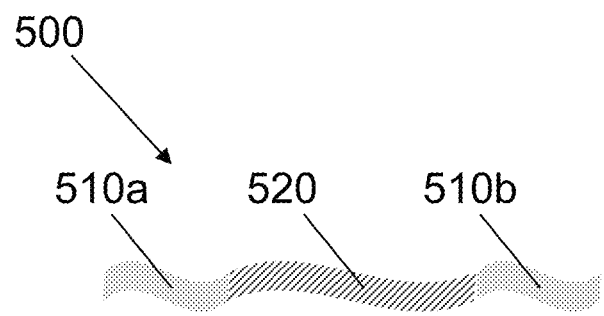
FIGS. 5A, 5B, and 5C are schematic drawings of a triblock copolymer and domain structures it can form, according to an embodiment of the invention.

FIG. 5A is a simplified illustration of an exemplary triblock polymer molecule 500 that has a first polymer block 510a, a second polymer block 520, and a third polymer block 510b that is the same as the first polymer block 510a, all covalently bonded together. In one arrangement the first polymer block 510a, the second polymer block 520, and the third copolymer block 510b are linear polymer blocks. In another arrangement, either some or all polymer blocks 510a, 520, 510b have a comb structure. In one arrangement, no polymer block is cross-linked. In another arrangement, one polymer block is cross-linked. In yet another arrangement, two polymer blocks are cross-linked. In yet another arrangement, all polymer blocks are cross-linked.

Figure 5B:
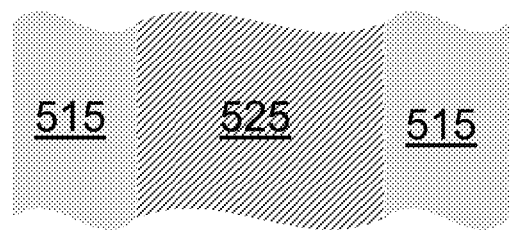
Figure 5C:
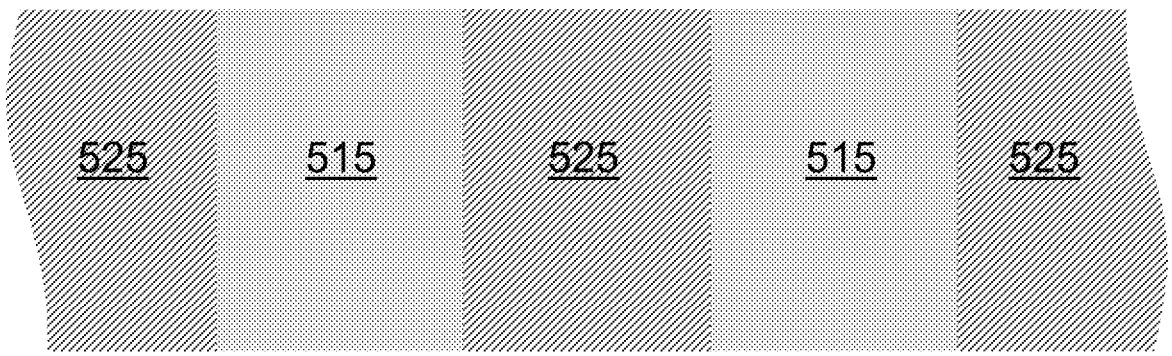

Multiple triblock polymer molecules 500 can arrange themselves to form a first domain 515 of a first phase made of the first polymer blocks 510a, a second domain 525 of a second phase made of the second polymer blocks 520, and a third domain 515 of a first phase made of the third polymer blocks 510b as shown in FIG. 5B. Triblock polymer molecules 500 can arrange themselves to form multiple repeat domains 525, 515 (containing both 510a and 510b), thereby forming a continuous nanostructured block copolymer material 540, as shown in FIG. 5C. The sizes of the domains can be adjusted by adjusting the molecular weights of each of the polymer blocks. In various arrangements, the domains can be lamellar, cylindrical, spherical, gyroidal, or any of the other well-documented triblock copolymer morphologies depending on the nature of the polymer blocks and their ratios in the block copolymer.

In one arrangement the first and third polymer domains 515 are ionically conductive, and the second polymer domain 525 provides mechanical strength to the nanostructured block copolymer. In another arrangement, the second polymer domain 525 is ionically conductive, and the first and third polymer domains 515 provide a structural framework.

Figure 6A:
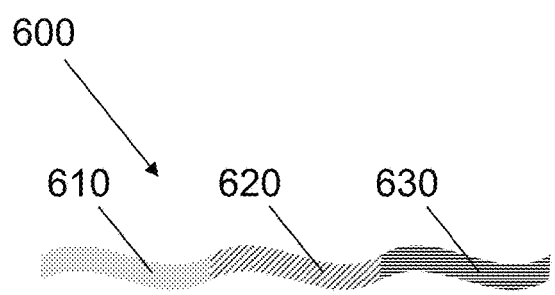
FIGS. 6A, 6B, and 6C are schematic drawings of a triblock copolymer and domain structures it can form, according to another embodiment of the invention.

FIG. 6A is a simplified illustration of another exemplary triblock polymer molecule 600 that has a first polymer block 610, a second polymer block 620, and a third polymer block 630, different from either of the other two polymer blocks, all covalently bonded together. In one arrangement the first polymer block 610, the second polymer block 620, and the third copolymer block 630 are linear polymer blocks. In another arrangement, either some or all polymer blocks 610, 620, 630 have a comb (or branched) structure. In one arrangement, no polymer block is cross-linked. In another arrangement, one polymer block is cross-linked. In yet another arrangement, two polymer blocks are cross-linked. In yet another arrangement, all polymer blocks are cross-linked.

Figure 6B:
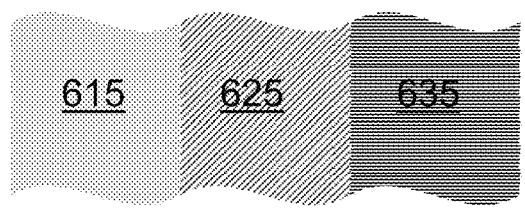
Figure 6C:
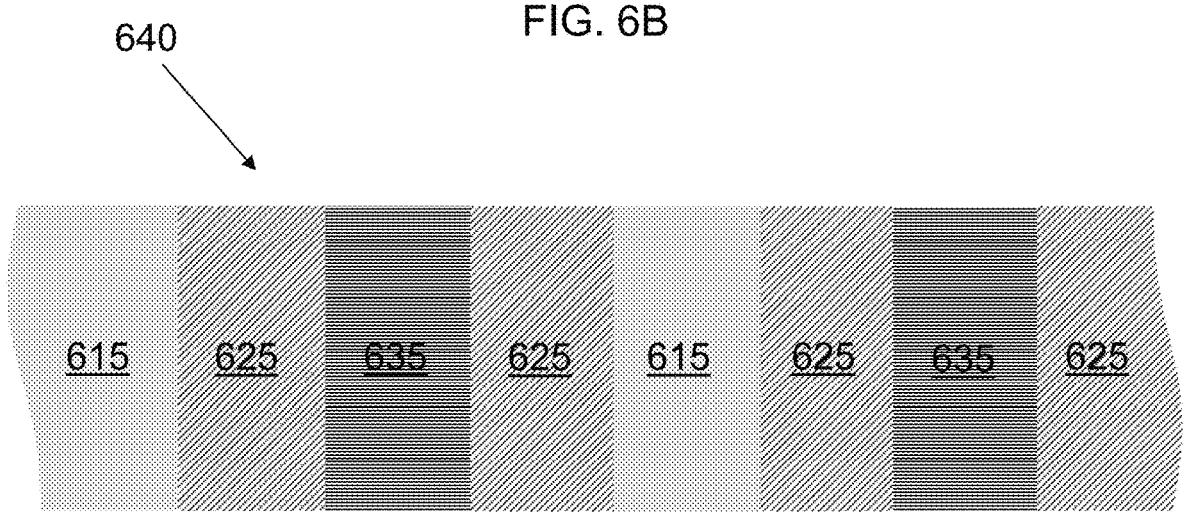

Multiple triblock polymer molecules 600 can arrange themselves to form a first domain 615 of a first phase made of the first polymer blocks 610a, a second domain 625 of a second phase made of the second polymer blocks 620, and a third domain 635 of a third phase made of the third polymer blocks 630 as shown in FIG. 6B. Triblock polymer molecules 600 can arrange themselves to form multiple repeat domains, thereby forming a continuous nanostructured block copolymer material 640, as shown in FIG. 6C. The sizes of the domains can be adjusted by adjusting the molecular weights of each of the polymer blocks. In various arrangements, the domains can be lamellar, cylindrical, spherical, gyroidal, or any of the other well-documented triblock copolymer morphologies depending on the nature of the polymer blocks and their ratios in the block copolymer.

In one arrangement the first polymer domains 615 are ionically conductive, and the second polymer domains 625 provide mechanical strength to the nanostructured block copolymer. The third polymer domains 635 provides an additional functionality that may improve mechanical strength, ionic conductivity, electrical conductivity, chemical or electrochemical stability, may make the material easier to process, or may provide some other desirable property to the block copolymer. In other arrangements, the individual domains can exchange roles.

Choosing appropriate polymers for the block copolymers described above is important in order to achieve desired electrolyte properties. In one embodiment, the conductive polymer (1) exhibits ionic conductivity of at least $10^{-5}$ $Scm^{-1}$ at electrochemical cell operating temperatures when combined with an appropriate salt(s), such as lithium salt(s); (2) is chemically stable against such salt(s); and (3) is thermally stable at electrochemical cell operating temperatures. In another embodiment the conductive polymer exhibits ionic conductivity of at least $10^{-3}$ $Scm^{-1}$ at electrochemical cell operating temperatures, such as at 25° C. or at 80° C. when combined with an appropriate salt(s). In another embodiment of the invention, electrolytes made from PEO grafted with perfluoro functional groups combined with appropriate salt(s) are used. Ionic liquids can be included with such electrolytes as well. Such electrolytes may have ionic conductivities that range between $10^{-2}$ $Scm^{-1}$ and $10^{-3}$ $Scm^{-1}$ at electrochemical cell operating temperatures, between 80° C. and 25° C.

In one embodiment, the structural material has a modulus in excess of $1 \times 10^5$ Pa at electrochemical cell operating temperatures. In one embodiment, the structural material has a modulus in excess of $1 \times 10^7$ Pa at electrochemical cell operating temperatures. In one embodiment, the structural material has a modulus in excess of $1 \times 10^9$ Pa at electrochemical cell operating temperatures. In one embodiment, the third polymer (1) is rubbery; and (2) has a glass transition temperature lower than operating and processing temperatures. It is useful if all materials are mutually immiscible. In one embodiment the block copolymer exhibits ionic conductivity of at least $10^{-4}$ $Scm^{-1}$ and has a modulus in excess of $1 \times 10^7$ Pa or $1 \times 10^8$ Pa at electrochemical cell operating temperatures. Examples of cell operating temperatures are 25° C. and 80° C.

In one embodiment of the invention, the conductive phase can be made of grafted copolymers, such as polymers made of PEO molecules onto which fluorinated groups have been grafted, as described above. The block copolymers may be either solid electrolytes under typical configurations or may be liquids when molecular weights are low (less than 1 kDa). The copolymers may also be used as gel electrolytes if combined with the appropriate liquid electrolytes.

There are no particular restrictions on the electrolyte salt that can be used in the block copolymer electrolytes. Any electrolyte salt that includes the ion identified as the most desirable charge carrier for the application can be used. It is especially useful to use electrolyte salts that have a large dissociation constant within the polymer electrolyte.

Suitable examples include alkali metal salts, such as Li salts. Examples of useful Li salts include, but are not limited to, $LiPF_6$, $LiN(CF_3SO_2)_2$, $Li(CF_3SO_2)_3C$, $LiN(SO_2CF_2CF_3)_2$, $LiB(C_2O_4)_2$, $B_{12}F_xH_{12-x}$, $B_{12}F_{12}$, and mixtures thereof. Non-lithium salts such as salts of aluminum, sodium, and magnesium are examples of other salts that can be used with their corresponding metals.

In one embodiment of the invention, single ion conductors can be used with electrolyte salts or instead of electrolyte salts. Examples of single ion conductors include, but are not limited to sulfonamide salts, boron based salts, and sulfates groups.

In one embodiment of the invention, the structural phase can be made of polymers such as polystyrene, hydrogenated polystyrene, polymethacrylate, poly(methyl methacrylate), polyvinylpyridine, polyvinylcyclohexane, polyimide, polyamide, polypropylene, poly (2,6-dimethyl-1,4-phenylene oxide) (PXE), polyolefins, poly(t-butyl vinyl ether), poly (cyclohexyl methacrylate), poly(cyclohexyl vinyl ether), polyethylene, fluorocarbons, such as polyvinylidene fluoride, or copolymers that contain styrene, methacrylate, or vinylpyridine. It is especially useful if the structural phase is rigid and is in a glassy or crystalline state.

Additional species can be added to nanostructured block copolymer electrolytes to enhance the ionic conductivity, to enhance the mechanical properties, or to enhance any other properties that may be desirable.

The ionic conductivity of nanostructured block copolymer electrolyte materials can be improved by including one or more additives in the ionically conductive phase. An additive can improve ionic conductivity by lowering the degree of crystallinity, lowering the melting temperature, lowering the glass transition temperature, increasing chain mobility, or any combination of these. A high dielectric additive can aid dissociation of the salt, increasing the number of Li+ ions available for ion transport, and reducing the bulky Li+[salt] complexes. Additives that weaken the interaction between Li+ and PEO chains/anions, thereby making it easier for Li+ ions to diffuse, may be included in the conductive phase. The additives that enhance ionic conductivity can be broadly classified in the following categories: low molecular weight conductive polymers, ceramic particles, room temp ionic liquids (RTILs), high dielectric organic plasticizers, and Lewis acids.

Other additives can be used in the polymer electrolytes described herein. For example, additives that help with overcharge protection, provide stable SEI (solid electrolyte interface) layers, and/or improve electrochemical stability can be used. Such additives are well known to people with ordinary skill in the art. Additives that make the polymers easier to process, such as plasticizers, can also be used.

In one embodiment of the invention, neither small molecules nor plasticizers are added to the block copolymer electrolyte and the block copolymer electrolyte is a dry polymer.

In one embodiment of the invention, ceramic electrolytes are added to the block copolymer. Examples of ceramic electrolytes that can be used in the embodiments of the invention include lithium silicate, lithium borate, lithium aluminate, lithium phosphate, lithium phosphorus oxynitride, lithium silicosulfide, lithium borosulfide, lithium aluminosulfide, and lithium phosphosulfide, lithium lanthanum titanium oxide, lithium lanthanum zirconium oxide, LiPON, LiSICON, $Li_{10}SnP_2S_{12}$, $Li_{11}Si_2PS_{12}$, $Li_{10}GeP_2S_{12}$, $Li_2S$—$SiS_2$—$Li_3PO_4$, $Li_{14}Zn(GeO_4)_4$, $Li_2S$—$P_2S_5$, $La_{0.5}Li_{0.5}TiO_3$, combinations thereof, and others known in the field.

Electrochemical Cells

In other embodiments of the invention, the electrolytes disclosed herein can be used in various parts of an electrochemical cell such as a battery.

In one arrangement, the electrolytes can be used as anolytes only in the anode or negative electrode. The electrolytes can be mixed with an anode active material, such as graphite, to form an anode for use with a lithium ion battery cell.

The negative electrode active material can be any of a variety of materials depending on the type of chemistry for which the cell is designed. In one embodiment of the invention, the cell is a lithium or lithium ion cell. The negative electrode material can be any material that can serve as a host material (i.e., can absorb and release) lithium ions. Examples of such materials include, but are not limited to graphite, lithium metal, and lithium alloys such as Li—Al, Li—Si, Li—Sn, and Li—Mg. Silicon and silicon alloys are known to be useful as negative electrode materials in lithium cells. Examples include silicon alloys of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) and mixtures thereof. In some arrangements, graphite, metal oxides, silicon oxides or silicon carbides can also be used as negative electrode materials.

In another arrangement, the electrolytes can be used as catholytes only in the cathode or positive electrode. The electrolytes can be mixed with a cathode active material, such as listed below, to form a cathode for use with a lithium battery.

The positive electrode active material can be any of a variety of materials depending on the type of chemistry for which the cell is designed. In one embodiment of the invention, the cell is a lithium or lithium ion cell. The positive electrode active material can be any material that can serve as a host material for lithium ions. Examples of such materials include, but are not limited to materials described by the general formula $Li_xA_{1-y}M_yO_2$, wherein A comprises at least one transition metal selected from the group consisting of Mn, Co, and Ni; M comprises at least one element selected from the group consisting of B, Mg, Ca, Sr, Ba, Ti, V, Cr, Mn, Fe, Co, Ni, Cu, Al, In, Nb, Mo, W, Y, and Rh; x is described by $0.05 \le x \le 1.1$; and y is described by $0 \le y \le 0.5$. In one arrangement, the positive electrode active material is $LiNi_{0.5}Mn_{0.5}O_2$.

In one arrangement, the positive electrode active material is described by the general formula: $Li_xMn_{2-y}M_yO_2$, where M is chosen from Mn, Ni, Co, and/or Cr; x is described by $0.05 \le x \le 1.1$; and y is described by $0 \le y \le 2$. In another arrangement, the positive electrode active material is described by the general formula: $Li_xM_yMn_{4-y}O_8$, where M is chosen from Fe and/or Co; x is described by $0.05 \le x \le 2$; and y is described by $0 \le y \le 4$. In another arrangement, the positive electrode active material is given by the general formula $Li_x(Fe_yM_{1-y})PO_4$, where M is chosen from transition metals such as Mn, Co and/or Ni; x is described by $0.9 \le x \le 1.1$; and y is described by $0 \le y \le 1$. In yet another arrangement, the positive electrode active material is given by the general formula: $Li(Ni_{0.5-x}Co_{0.5-x}M_{2x})O_2$, where M is chosen from Al, Mg, Mn, and/or Ti; and x is described by $0 \le x \le 0.2$. In some arrangements, the positive electrode material includes $LiNiVO_2$.

In one arrangement, the positive electrode active material is selected from any one or more of compounds such as, $FeS_2$, FeOF, $FeF_3$, $FeF_2$ and $MoO_3$, sulfur, lithium polysulfides, CuO, $Cu_2O$, FeO, $Fe_2O_3$, $V_6O_{13}$, $VO_2$, $Li_{1+x}V_3O_8$ ($0 \le x \le 3$), $Ag_xV_2O_5$ ($0 < x \le 2$), $Cu_xV_4O_{11}$ ($0 < x \le 3$), and $VOPO_4$, $LiCoO_2$, LFP, NCM, NCA, or mixtures thereof.

In yet another embodiment of the invention, the electrolytes can be used in the separator of a battery, providing a medium for ionic communication between the anode and the cathode. If the electrolyte is liquid or a gel, it may be used with a separator membrane, such as Celgard®, as is known in the art. If the electrolyte is a solid or a high-viscosity gel, it may be used without a separator membrane.

Combinations of the above uses are also possible. In one arrangement, the electrolytes are used in all parts of the battery. In another arrangement, the electrolytes are used in the cathode and in the separator with a lithium metal or lithium alloy foil anode.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A block copolymer electrolyte comprising:
   a block copolymer comprising:
      a first block which is a graft copolymer comprising a plurality of PEO molecules and perfluoro functional groups grafted onto at least a portion of the plurality of PEO molecules, the perfluoro functional groups represent between 1 mol % and 20 mol % of the graft copolymer; and
      a second block comprising a polymer that has a modulus in excess of $1 \times 10^5$ Pa at temperatures at and below 25° C.; and
   a metal salt.

2. The block copolymer electrolyte of claim 1 wherein the perfluoro functional groups are selected from the group consisting of perfluoropolyether (PFPE), polyvinylene fluoride, polyvinylfluoride, polytetrafluoroethylene, perfluoroalkane (PFA), perfluoro(methylcyclohexane), perfluoro(methylcyclopentane), pentafluorophenoxide, 2,3,5,6-tetrafluorophenol, and combinations thereof.

3. The block copolymer electrolyte of claim 1 wherein the metal salt comprises at least one lithium salt.

4. The block copolymer electrolyte of claim 1 wherein the first block further comprises an ionic liquid.

5. The block copolymer electrolyte of claim 1 wherein the block copolymer is either a diblock copolymer or a triblock copolymer.

6. The block copolymer electrolyte of claim 1 wherein the polymer of the second block is selected from the group consisting of polystyrene, hydrogenated polystyrene, poly (methyl methacrylate), polyvinylpyridine, polyvinylcyclohexane, polyimide, polyamide, polypropylene, poly (2,6-dimethyl-1,4-phenylene oxide) (PXE), poly(t-butyl vinyl ether), poly(cyclohexyl methacrylate), poly(cyclohexyl vinyl ether), polyethylene, polyvinylidene fluoride, and copolymers that contain styrene, methacrylate, and/or vinylpyridine.

7. A battery cell, comprising:
   an anode comprising lithium metal;
   a cathode comprising cathode active material and a first electrolyte; and
   a separator comprising a second electrolyte, the second electrolyte comprising the block copolymer electrolyte of claim 1.

8. The battery cell of claim 7 wherein the first electrolyte comprises the block copolymer electrolyte of claim 1.

9. An electrode comprising:
   electrode active material; and
   a polymer electrolyte comprising the block copolymer electrolyte of claim 1.

10. The electrode of claim 9 wherein the electrode is a positive electrode.

11. The block copolymer electrolyte of claim 1 wherein the perfluoro functional groups are selected from the group consisting of cyclic perfloro alkanes, aromatic versions thereof, and combinations thereof.

12. The block copolymer electrolyte of claim 1 wherein the polymer of the second block is selected from the group consisting of polymethacrylate, polyolefins, and fluorocarbons.

13. A block copolymer electrolyte comprising:
    a block copolymer comprising:
       a first block which is a graft copolymer comprising a plurality of PEO molecules and perfluoro functional groups grafted onto at least a portion of the plurality of PEO molecules, the plurality of PEO molecules has a molecular weight between 10 and 500 KDa; and
       a second block comprising a polymer that has a modulus in excess of $1 \times 10^5$ Pa at temperatures at and below 25° C.; and
    a metal salt.

14. The block copolymer electrolyte of claim 13 wherein the perfluoro functional groups have a molecular weight ranging from 200 to 10,000 Da.

15. The block copolymer electrolyte of claim 13 wherein the perfluoro functional groups are selected from the group consisting of perfluoropolyether (PFPE), polyvinylene fluoride, polyvinylfluoride, polytetrafluoroethylene, perfluoroalkane (PFA), perfluoro(methylcyclohexane), perfluoro(methylcyclopentane), pentafluorophenoxide, 2,3,5,6-tetrafluorophenol, and combinations thereof.

16. The block copolymer electrolyte of claim 13 wherein the metal salt comprises at least one lithium salt.

17. The block copolymer electrolyte of claim 13 wherein the first block further comprises an ionic liquid.

18. The block copolymer electrolyte of claim 13 wherein the block copolymer is either a diblock copolymer or a triblock copolymer.

19. The block copolymer electrolyte of claim 13 wherein the polymer of the second block is selected from the group consisting of polystyrene, hydrogenated polystyrene, poly (methyl methacrylate), polyvinylpyridine, polyvinylcyclohexane, polyimide, polyamide, polypropylene, poly (2,6-dimethyl-1,4-phenylene oxide) (PXE), poly(t-butyl vinyl ether), poly(cyclohexyl methacrylate), poly(cyclohexyl vinyl ether), polyethylene, polyvinylidene fluoride, and copolymers that contain styrene, methacrylate, and/or vinylpyridine.

20. A block copolymer electrolyte comprising:
    a block copolymer comprising:
       a first block which is a graft copolymer comprising a plurality of PEO molecules and perfluoro functional groups grafted onto at least a portion of the plurality of PEO molecules, the perfluoro functional groups have a molecular weight ranging from 200 to 10,000 Da; and
       a second block comprising a polymer that has a modulus in excess of $1 \times 10^5$ Pa at temperatures at and below 25° C.; and
    a metal salt.

* * * * *